(12) United States Patent
Shan (10) Patent No.: US 10,747,065 B2
(45) Date of Patent: Aug. 18, 2020

(54) DISPLAY PANEL AND DISPLAY DEVICE

(71) Applicant: HKC Corporation Limited, Shenzhen, Guangdong (CN)

(72) Inventor: Jianfeng Shan, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 16/255,998

(22) Filed: Jan. 24, 2019

(65) Prior Publication Data

US 2020/0026112 A1 Jan. 23, 2020

Related U.S. Application Data (63) Continuation of application No. PCT/CN2018/124217, filed on Dec. 27, 2018.

(30) Foreign Application Priority Data

Jul. 17, 2018 (CN) .......................... 2018 1 0784562

(51) Int. Cl.
*G02F 1/1335* (2006.01)
*G02F 1/1339* (2006.01)

(52) U.S. Cl.
CPC .... *G02F 1/13394* (2013.01); *G02F 1/133514* (2013.01); *G02F 2001/13396* (2013.01)

(58) Field of Classification Search
CPC ........... G02F 1/13394; G02F 1/133514; G02F 2001/13396
See application file for complete search history.

(56) References Cited

U.S. PATENT DOCUMENTS

| 2007/0002263 | A1* | 1/2007 | Kim | ..................... G02F 1/13394 349/156 |
| 2009/0231522 | A1* | 9/2009 | Kim | ..................... G02F 1/13394 349/106 |
| 2011/0317109 | A1* | 12/2011 | So | ....................... G02F 1/13394 349/109 |
| 2013/0100385 | A1* | 4/2013 | Hou | .................. G02F 1/133512 349/106 |
| 2018/0120619 | A1* | 5/2018 | Cho | ....................... G02F 1/1368 |

FOREIGN PATENT DOCUMENTS

| CN | 1519593 | A | 8/2004 |
| CN | 102213857 | A | 10/2011 |
| CN | 103149741 | A | 6/2013 |
| CN | 107589596 | A | 1/2018 |
| JP | 2010128248 | A | 6/2010 |

* cited by examiner

*Primary Examiner* — Thanh Nhan P Nguyen (57) ABSTRACT

The present disclosure discloses a display panel and a display device. The display panel comprises a switch array substrate, an opposite substrate and a display medium layer. The switch array substrate includes a scanning line; the opposite substrate includes a color resistance layer and a plurality of spacers, the projections of the first color resistance and the second color resistance on the switch array substrate and the scanning line respectively have a first overlapping region and a second spacer; and a first distance from a first color resistance to the switch array substrate is less than a second distance from a second color resistance to the switch array substrate.

9 Claims, 7 Drawing Sheets

DISPLAY PANEL AND DISPLAY DEVICE

CROSS REFERENCE TO RELATED APPLICATIONS

The present application is a Continuation Application of PCT Application No. PCT/CN2018/124217 filed on Dec. 27, 2018, which claims the benefit of Chinese Patent Application No. 201810784562.8, filed on Jul. 17, 2018, which is incorporated herein by reference in its entirety.

FIELD

The present disclosure relates to the field of display technologies, in particular, to a display panel and a display device.

BACKGROUND OF THE DISCLOSURE

A common technology used by a display panel plant when combining a display panel such as a liquid crystal panel is One Drop Filling (ODF) technology. The technology is mainly characterized in that a glue material is coated on a substrate in a vacuum environment, to define a liquid crystal partition range required by each region. Liquid crystal material is then dispersed and dripped on the substrate in batches, and then the substrate and an other substrate are mutually paired, pressured together and ultraviolet cured, and the liquid crystal cell (liquid crystal panel) is manufactured. In order to conveniently control the thickness of the liquid crystal cell, spacers of different heights are used to adjust and fix the thickness of the whole liquid crystal cell, to obtain a stable optical display effect. In the liquid crystal cell, the cell thickness is not determined only by the height of the spacers, the cell thickness relates to the amount of filled liquid crystal, the height of the spacers, the thickness of each layer of metal film, and the height difference of the positions where the spacers are located. If the amount of filled liquid crystal is too large, the liquid crystal cell will have gravity mura. (i.e., the phenomenon that the lower edge of a liquid crystal display screen is nonuniform in color when powering on at a high temperature); if the amount of the filled liquid crystal is insufficient, air bubbles are prone to generate. The height of the spacers can also affect the cell thickness.

At present, two different heights of spacers are commonly used and uniformly distributed on a color filter substrate within the display region of a display device according to a certain proportion. Due to the fact that this design has different heights of spacers, the functions of supporting, pressure resistance, and controlling of liquid crystal amount can be realized. However, in this way, the height difference of the spacers is merely the height difference of the spacers with different heights, and the amount of liquid crystal surplus which can be adjusted and controlled is still not large enough. If the relative height difference between the spacers is larger, an adjustment of the liquid crystal amount is more elastic, and the amount of liquid crystal surplus is larger. Therefore, how to obtain larger height difference of spacers to increase the amount of liquid crystal surplus is a problem in the current liquid crystal display technology.

The statements herein provide only background information related to the present disclosure without necessarily constituting the prior art.

SUMMARY

Therefore, embodiments of the present disclosure provide a display panel, aim to obtain a larger height difference of the spacers, improve the adjusting and controlling capability of the liquid crystal quantity, and increase the amount of liquid crystal surplus.

Specifically, a display panel according to some embodiments of the present disclosure, includes: a switch array substrate, including a scanning line; an opposite substrate, defined opposite to the switch array substrate, the opposite substrate includes a color resistance layer and a plurality of spacers, the color resistance layer includes a first color resistance and a second color resistance, the projection of the first color resistance on the switch array substrate and the scanning line have a first overlapping region, the projection of the second color resistance on the switch array substrate and the scanning line have a second overlapping region, and the plurality of spacers are arranged at a side, adjacent to the switch array substrate, of the color resistance layer, the plurality of spacers includes a first spacer and a second spacer; and a display medium layer, defined between the switch array substrate and the opposite substrate. The first spacer is located within the first overlapping region of the first color resistance and supported by the first color resistance, the second color resistance defines a first opening within the second overlapping region, the second spacer is defined in the first opening, and a first distance from the first spacer to the switch array substrate is less than a second distance from the second spacer to the switch array substrate.

In an exemplary embodiment of the present disclosure, a height difference between the first spacer and the second spacer is greater than or equal to the initial thickness of the second color resistance within the second overlapping region before the second color resistance forms the first opening.

In an exemplary embodiment of the present disclosure, the height of the first spacer is larger than the height of the second spacer.

In an exemplary embodiment of the present disclosure, the opposite substrate further includes: a black matrix, located at a side, away from the switch array substrate, of the color resistance layer; the black matrix defines a second opening within the second overlapping region, the second opening is communicated with the first opening, the second spacer is located in the second opening so as to be surrounded by the second opening.

In an exemplary embodiment of the present disclosure, the second opening is the same as the first opening in shape, and the opening size of the first opening is larger than the opening size of the second opening.

In an exemplary embodiment of the present disclosure, the height difference between the first spacer and the second spacer is greater than or equal to the sum of the initial thickness of the second color resistance within the second overlapping region before the second color resistance forms the first opening and the initial thickness of the black matrix within the second overlapping region before the black matrix forms the second opening.

In an exemplary embodiment of the present disclosure, an opening is formed at two side boundaries of the first color resistance along a length direction of the scanning line within the first overlapping region.

In an exemplary embodiment of the present disclosure, the opposite substrate further includes a transparent electrode layer, the transparent electrode layer is located at a side, adjacent to the switch array substrate, of the color resistance layer, the transparent electrode layer covers the first color resistance and the second color resistance, the transparent electrode layer is further located in the first opening and the second opening; the first spacer and the second spacer are located at a side, adjacent to the switch array substrate, of the transparent electrode layer.

In an exemplary embodiment of the present disclosure, the opposite substrate further includes a black matrix and a transparent electrode layer, the black matrix is located at a side, away from the switch array substrate, of the color resistance layer, the transparent electrode layer is located at a side, adjacent to the switch array substrate, of the color resistance layer, the transparent electrode layer covers the first color resistance and the second color resistance, the transparent electrode layer is further located in the first opening; the first spacer and the second spacer are located at a side, adjacent to the switch array substrate, of the transparent electrode layer.

A display device provided by embodiments of the present disclosure, includes a first polarizer, a second polarizer and any one of the display panels mentioned above, the first polarizer and the second polarizer are respectively arranged on two opposite sides of the display panel.

The above mentioned technical solution may have one or more of the following advantages: according to the embodiments of the present disclosure, the first spacer is located within the first overlapping region which is formed by the projection of the first color resistance on the switch array substrate and the scanning line, and the first opening is formed within the second overlapping region which is formed by the projection of the second color resistance on the switch array substrate and the scanning line, and the second spacer is located in the first opening, so as to form a larger height difference between the first spacer and the second spacer, the adjustment and control capability of liquid crystal quantity is improved, and the amount of liquid crystal surplus is increased.

BRIEF DESCRIPTION OF THE DRAWINGS

To illustrate the technical solutions more clearly according to the embodiments of the present disclosure or in the prior art, the accompanying drawings for describing the embodiments or the prior art are introduced briefly hereinafter. Apparently, the accompanying drawings in the following description are only about some embodiments of the present disclosure, and persons of ordinary skill in the art can derive other drawings from the accompanying drawings without creative efforts.

The realizing of the aim, functional characteristics, advantages of the present disclosure are further described in detail with reference to the accompanying drawings and the embodiments.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a special form (referring to figures), and so on, if the special form changes, the directional instructions changes accordingly.

In the present disclosure, unless explicitly stated and defined, the terms "connected", "fixed" and the like should be understood comprehensively, for example, the "fixed" can be fixedly connected or can be detachably connected, or integrated with each other, and can be mechanically connected or electrically connected; it can be directly connected or indirectly connected through an intermediate medium. It can be internal connected between two elements, or the interaction relation between the two elements, unless explicitly defined otherwise. For persons of ordinary skilled in the art, the specific meanings of the terms in the disclosure can be understood according to specific situations.

In addition, the descriptions, such as the "first", the "second" in the present disclosure, can only be used for describing the aim of description, and cannot be understood as indicating or suggesting relative importance or impliedly indicating the number of the indicated technical character. Therefore, the character indicated by the "first", the "second" can express or impliedly include at least one character. In addition, the technical proposal of each exemplary embodiment can be combined with each other, however the technical proposal must base on that the ordinary skill in that art can realize the technical proposal, when the combination of the technical proposals occurs contradiction or cannot realize, it should consider that the combination of the technical proposals does not existed, and is not contained in the protection scope required by the present disclosure.

Figure 1:
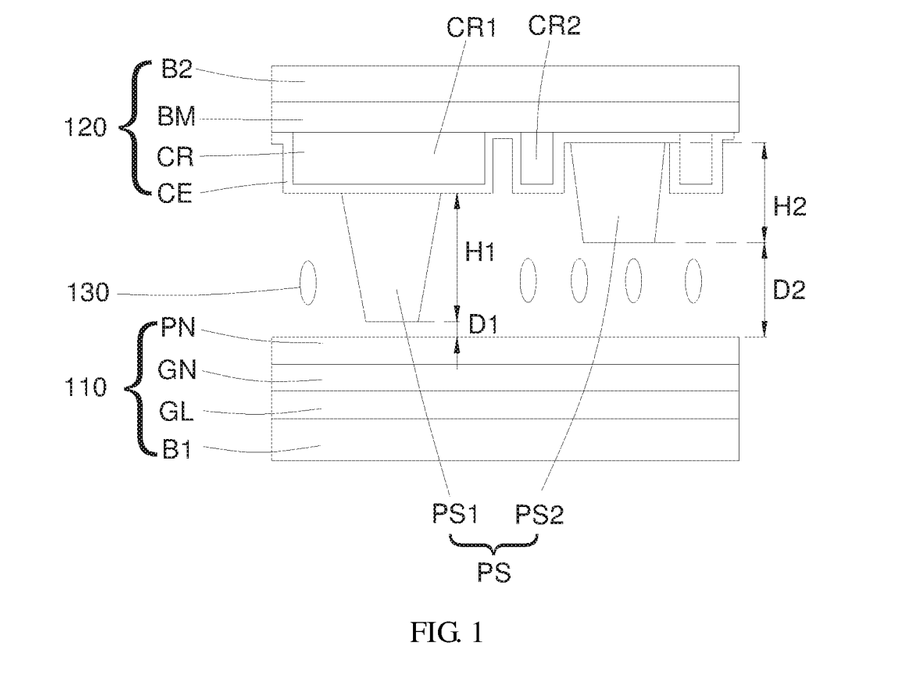
FIG. 1 is a schematic cross-sectional view of a display panel according to an embodiment of the present disclosure.
Figure 2:
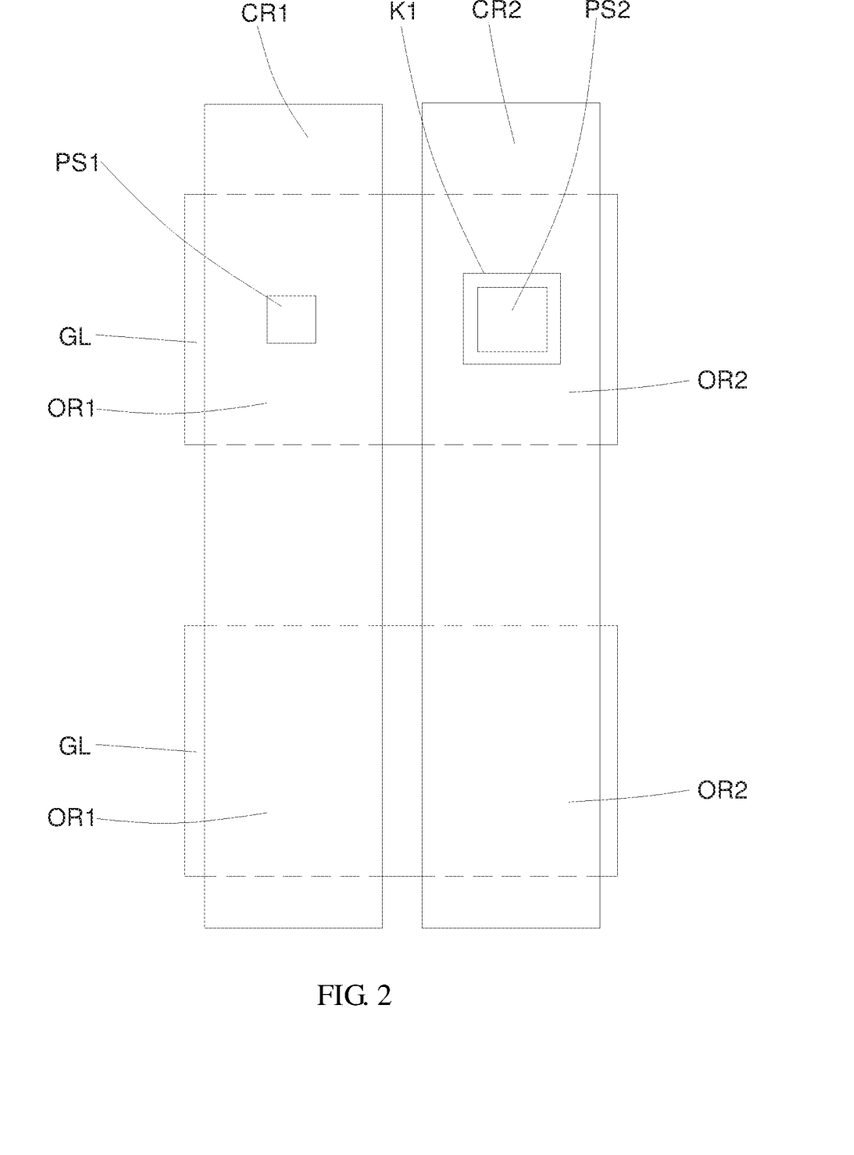
FIG. 2 is a schematic plane diagram of a position relation of a projection of a color resistance layer on a switch array substrate and a scanning line, spacers.

Referring to FIG. 1 and FIG. 2, FIG. 1 is a schematic cross-sectional view of a display panel 10 according to an embodiment of the present disclosure. FIG. 2 is a schematic plane diagram of a position relation of a projection of a color resistance layer on a switch array substrate and a scanning line, spacers.

Specifically, an embodiment of the present disclosure provides a display panel 10, including a switch array substrate 110, an opposite substrate 120 and a display medium layer 130.

The switch array substrate 110 can be an array substrate, such as a thin film transistor (TFT) array substrate and the like, and configured to transmit and control electric signals. As shown in FIG. 1, the switch array substrate 110 includes a substratum B1, and the substratum B1 can be made of, for example, the glass, the quartz, the organic polymer or other suitable materials. The switch array substrate 110 further includes a scanning line GL, the scanning line GL forms on the substratum B2. The material of the scanning line GL can be molybdenum, aluminum, copper, titanium, tungsten and the like. The switch array substrate 110 further includes an insulating layer GN, and the insulating layer GN is arranged at a side, away from the substratum B1, of the scanning line GL. The switch array substrate 110 further includes a passivation layer PN, and the passivation layer PN is arranged at a side, away from the substratum B1, of the insulating layer GN.

In addition, as shown in FIG. 1, the opposite substrate 120 is defined opposite to the switch array substrate 110. The opposite substrate 120 may be, for example, a substrate such as a color filter substrate and configured to realize the display of colors. The opposite substrate 120 includes a color resistance layer CR. The material of the color resistance layer CR can be, for example, a resin type pigment dispersion type color photoresist and the like. The color resistance layer CR includes a plurality of color resistances with different colors, for example, red color resistance, green color resistance or blue color resistance, and it can also be other color resistances, such as yellow color resistances, white color resistances and the like. As shown in FIG. 2, the color resistance layer CR concludes a plurality of strip-shaped color resistances which are arranged in rows and columns, for example, a color resistance CR1 (a first color resistance) and a color resistance CR2 (a second color resistance). The projection of the color resistance CR1 on the switch array substrate 110 and the scanning line GL have an overlapping region OR1 (a first overlapping region), the projection of the color resistance CR2 on the switch array substrate 110 and the scanning line GL have an overlapping region OR2 (a second overlapping region).

As shown in FIG. 1, the opposite substrate 120 also includes a plurality of spacers PS. The material of the spacer PS can be, for example, photoresist material. The spacer PS is located at a side, adjacent to the switch array substrate 110, of the color resistance layer CR. The spacer PS includes a spacer PS1 (a first spacer) and a spacer PS2 (a second spacer). The height of the spacer PS1 (that is, the distance between the upper end and the lower end of the spacer PS1 in the vertical direction in FIG. 1) is H1, and the height of the spacer PS2 (that is, the distance between the upper end and the lower end of the spacer PS2 in the vertical direction in FIG. 1) is H2. Optionally, the height H1 of the spacer PS1 is larger than the height H2 of the spacer PS2.

As shown in FIG. 2, the spacer PS1 is located within the overlapping region OR1 of the color resistance CR1 and is supported by the color resistance CR1, and the color resistance CR2 defines an opening K1 (a first opening) within the overlapping region OR2, and the spacer PS2 is located in the opening K1. It is noted that the opening K1 within the overlapping region OR2 can run through the color resistance CR2 in the width direction (the horizontal direction in FIG. 2) of the color resistance CR2. The distance from an end of the spacer PS1 adjacent to the switch array substrate 110 to the switch array substrate 110 is a first distance D1 from the spacer PS1 to the switch array substrate 110; the distance from an end of the spacer PS2 adjacent to the switch array substrate 110 to the switch array substrate 110 is a second distance D2 from the spacer PS2 to the switch array substrate 110, and D1 is smaller than D2. The difference value between D2 and D1 is represented by the height difference D between the spacer PS1 and the spacer PS2, namely D=D2−D1. When the height H1 of the spacer PS1 is equal to the height H2 of the spacer PS2, the height difference D between the spacer PS1 and the spacer PS2 is equal to the initial thickness of the color resistance CR2 within the overlapped region OR2 before the opening K1 is formed in the color resistance CR2. When the height H1 of the spacer PS1 is larger than the height H2 of the spacer PS2, the height difference D between the spacer PS1 and the spacer PS2 is larger than the initial thickness of the color resistance CR2 within the overlapping region OR2 before the opening K1 is formed in the color resistance CR2. Therefore, a larger height difference is formed between the spacer PS1 and the spacer PS2, so that a larger amount of display medium adjustment and control surplus can be obtained.

In addition, the opposite substrate 120 also includes a black matrix BM. The black matrix BM is located at a side, away from the switch array substrate 110, of the color resistance layer CR. The material of the black matrix BM can be, for example, an opaque material such as black light resistance containing carbon black. The main function of the black matrix BM is to prevent light leakage and increase a contrast ratio. Further, the opposite substrate 120 may also include a transparent electrode layer CE. The transparent electrode layer CE is located at a side, adjacent to the switch array substrate 110, of the color resistance layer CR, and the transparent electrode layer CE covers the color resistance layer CR1 and the color resistance CR2. In addition, the transparent electrode layer CE is further located in the opening K1. The spacer PS1 and the spacer PS2 are located at a side, adjacent to the switch array substrate 110, of the transparent electrode layer CE. The transparent electrode layer CE can be, for example, transparent oxide material such as indium-tin-oxide (ITO). It is noted that the transparent electrode layer CE can be an entire piece of transparent conducting layer, or can be a plurality of strip-shaped transparent conducting layers, or a plurality of transparent conducting blocks which are arranged in rows and columns.

Further, as shown in FIG. 1, the display medium layer 30, such as a liquid crystal layer, is defined between the switch array substrate 110 and the opposite substrate 120.

It is noted that the opposite substrate 120 further includes a substratum B2. The substratum B2 is arranged at a side, away from the switch array substrate 110, of the black matrix BM. The material of the substratum B2 can be, for example, the glass, the quartz, the organic polymer, or other suitable materials.

Figure 3:
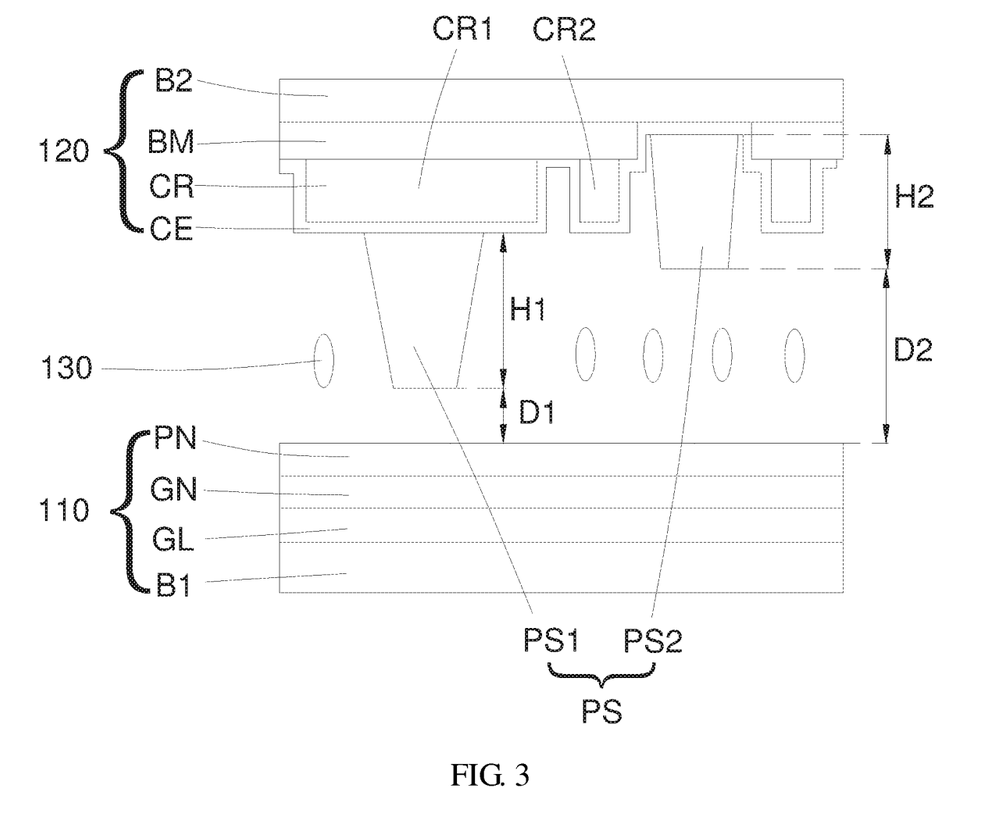
FIG. 3 is a schematic cross-sectional view of a display panel according to another embodiment of the present disclosure.
Figure 4:
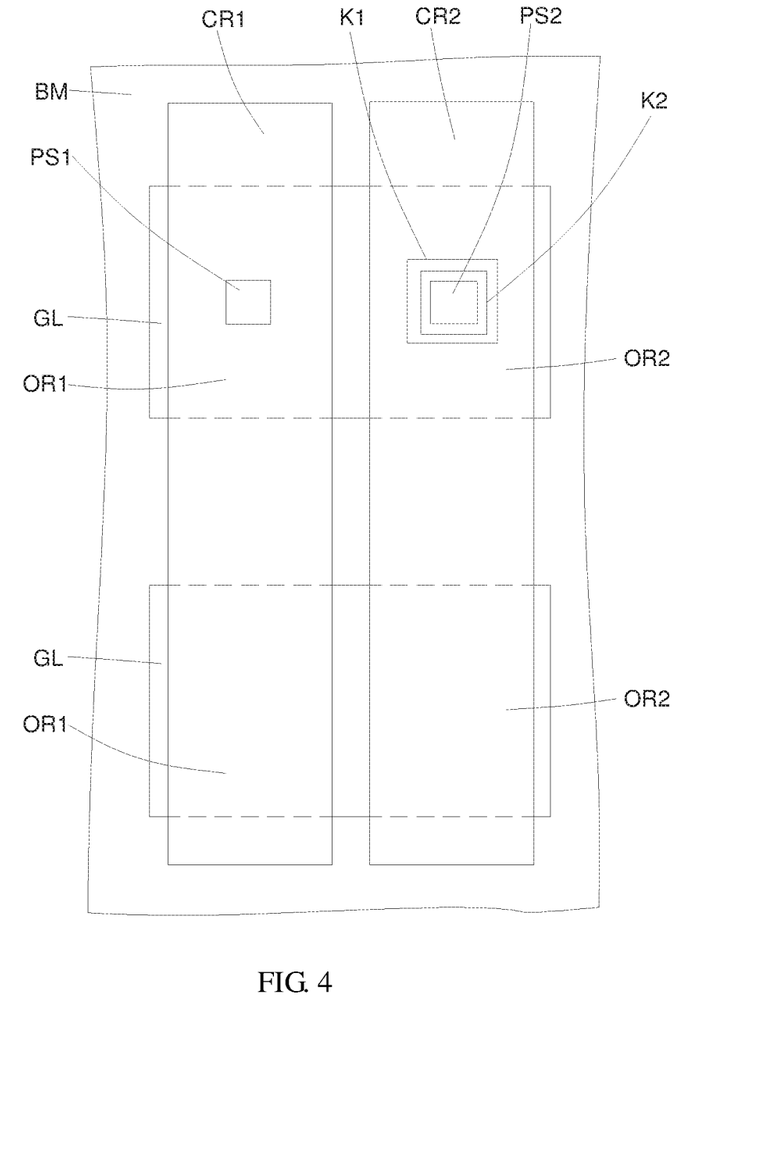
FIG. 4 is a schematic plane diagram of a position relation between a projection of a color resistance layer and a black matrix respectively on a switch array substrate and a scanning line and spacers.

Referring to FIG. 3 and FIG. 4, FIG. 3 is a schematic cross-sectional view of a display panel according to another embodiment of the present disclosure, FIG. 4 is a schematic plane diagram of a position relation of a projection of a color resistance layer and a black matrix respectively on a switch array substrate and a scanning line, spacers.

Specifically, another embodiment of the present disclosure provides a display panel 10, including: a switch array substrate 110, an opposite substrate 120 and a display medium layer 130.

The switch array substrate 110 can be an array substrate, such as a thin film transistor (TFT) array substrate and the like, and configured to transmit and control electric signals. As shown in FIG. 3, the switch array substrate 110 includes a substratum B1, and the substratum B1 can be made of, for example, the glass, the quartz, the organic polymer or other suitable materials. The switch array substrate 110 further includes a scanning line GL, the scanning line GL forms on the substratum B1. The material of the scanning line GL can be molybdenum, aluminum, copper, titanium, tungsten and the like. The switch array substrate 110 further includes an insulating layer GN, and the insulating layer GN is arranged at a side, away from the substratum B2, of the scanning line GL. The switch array substrate 110 further includes a passivation layer PN, and the passivation layer PN is arranged at a side, away from the substratum B2, of the insulating layer GN.

As shown in FIG. 3, the opposite substrate 120 is defined opposite to the switch array substrate 110. The opposite substrate 120 may be, for example, a substrate such as a color filter substrate and configured to realize the display of colors. The opposite substrate 120 includes a color resistance layer CR. The material of the color resistance layer CR can be, for example, a resin type pigment dispersion type color photoresist and the like. The color resistance layer CR includes a plurality of color resistances with different colors, for example, red color resistance, green color resistance or blue color resistance, and it can also be other color resistances, such as yellow color resistances, white color resistances and the like. As shown in FIG. 4, the color resistance layer CR concludes a plurality of strip-shaped color resistances which are arranged in rows and columns, for example, a color resistance CR1 (a first color resistance) and a color resistance CR2 (a second color resistance). The projection of the color resistance CR1 on the switch array substrate 110 and the scanning line GL have an overlapping region OR1 (a first overlapping region), the projection of the color resistance CR2 on the switch array substrate 110 and the scanning line GL have an overlapping region OR2 (a second overlapping region).

As shown in FIG. 3, the opposite substrate 120 also includes a plurality of spacers PS. The material of the spacer PS can be, for example, photoresist material. The spacer PS is located at a side, adjacent to the switch array substrate 110, of the color resistance layer CR. The spacer PS includes a spacer PS1 (a first spacer) and a spacer PS2 (a second spacer). The height of the spacer PS1 (that is, the distance between the upper end and the lower end of the spacer PS1 in the vertical direction in FIG. 3) is H1, and the height of the spacer PS2 (that is, the distance between the upper end and the lower end of the spacer PS2 in the vertical direction in FIG. 3) is H2. Optionally, the height H1 of the spacer PS1 is larger than the height H2 of the spacer PS2.

As shown in FIG. 4, the spacer PS1 is located within the overlapping region OR1 of the color resistance CR1 and is supported by the color resistance CR1, and the color resistance CR2 defines an opening K1 (a first opening) within the overlapping region OR2, and the spacer PS2 is located in the opening K1. It is noted that the opening K1 within the overlapping region OR2 can run through the color resistance CR2 in the width direction (the horizontal direction in FIG. 2) of the color resistance CR2. The distance from an end of the spacer PS1 adjacent to the switch array substrate 110 to the switch array substrate 110 is a first distance D1 from the spacer PS1 to the switch array substrate 110; the distance from an end of the spacer PS2 adjacent to the switch array substrate 110 to the switch array substrate 110 is a second distance D2 from the spacer PS2 to the switch array substrate 110, and D1 is smaller than D2. The difference value between D2 and D1 is represented by the height difference D between the spacer PS1 and the spacer PS2, namely $D=D2-D1$. When the height H1 of the spacer PS1 is equal to the height H2 of the spacer PS2, the height difference D between the spacer PS1 and the spacer PS2 is equal to the initial thickness of the color resistance CR2 within the overlapped region OR2 before the opening K1 is formed in the color resistance CR2. When the height H1 of the spacer PS1 is larger than the height H2 of the spacer PS2, the height difference D between the spacer PS1 and the spacer PS2 is larger than the initial thickness of the color resistance CR2 within the overlapping region OR2 before the opening K1 is formed in the color resistance CR2. Therefore, a height difference is formed between the spacer PS1 and the spacer PS2, so that a larger amount of display medium adjustment and control surplus can be obtained.

Furthermore, the opposite substrate 120 may also include a transparent electrode layer CE. The transparent electrode layer CE is located at a side, adjacent to the switch array substrate 110, of the color resistance layer CR, and the transparent electrode layer CE covers the color resistance layer CR1 and the color resistance CR2. The transparent electrode layer CE can be, for example, transparent oxide material such as indium-tin-oxide (ITO). It is noted that the transparent electrode layer CE can be an entire piece of transparent conducting layer, or can be a plurality of strip-shaped transparent conducting layers, or a plurality of transparent conducting blocks which are arranged in rows and columns.

In addition, the opposite substrate 120 also includes a black matrix BM. The material of the black matrix BM can be, for example, an opaque material such as black light resistance containing carbon black. The main function of the black matrix BM is to prevent light leakage and increase a contrast ratio. As shown in FIG. 4, the black matrix BM is located at a side, away from the switch array substrate 110, of the color resistance layer CR. The black matrix BM defines an opening K2 (a second opening) within the overlapping region OR2, and the opening K2 is communicated with the opening K1. The spacer PS2 is located in the opening K2 so as to be surrounded by the opening K2. Therefore, when H1 is equal to H2, the height difference D between the spacer PS1 and the spacer PS2 is equal to the sum of the initial thickness of the color resistance CR2 within the overlapping region OR2 before the color resistance CR2 forms the opening K1 and the initial thickness of the black matrix BM within the overlapping region OR2 before the black matrix BM forms the opening K2. When the height H1 of the spacer PS1 is larger than the height H2 of the spacer PS2, the difference value D between the distance D2 and the distance D1 is greater than the difference value d between the distance D2 and the distance D1 and is larger than the sum of the initial thickness of the color resistance CR2 within the overlapping region OR2 before the color resistance CR2 forms the opening K1 and the initial thickness of the black matrix BM within the overlapping region OR2 before the black matrix BM forms the opening K2. In this way, the height difference D between the spacer PS1 and the spacer PS2 is further increased, and a larger amount of display medium judgment and control surplus can be further obtained.

Optionally, the opening K2 is the same as the opening K1 in shape, for example, the shape of the opening K2 and the shape of the opening K1 are both square, circular or other shapes.

Further Optionally, the opening sizes of the openings K2 and the openings K1 are different, for example, the opening size of the opening K1 is larger than the opening size of the opening K2, that is, when the shape of the opening K2 and the shape of the opening K1 are both circular, the circular diameter of the opening K1 is larger than the circular diameter of the opening K2.

Figure 5:
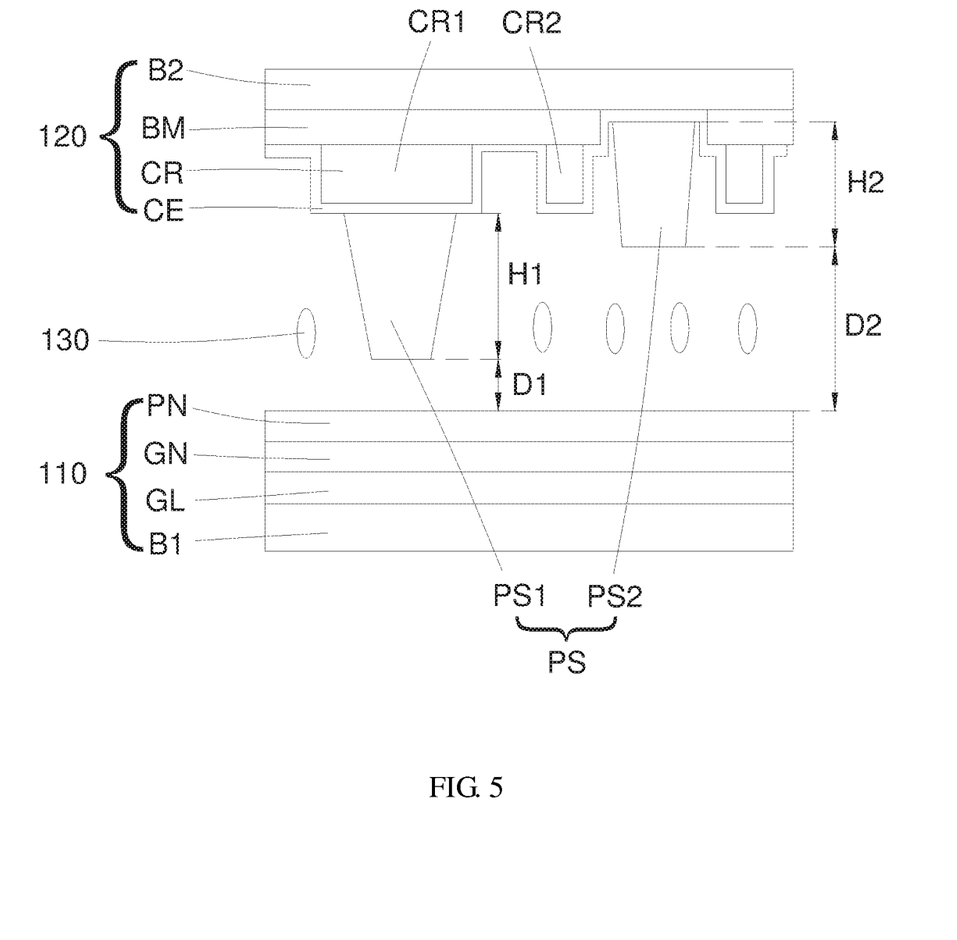
FIG. 5 is a schematic cross-sectional view of a display panel with a color resistance boundary opening.
Figure 6:
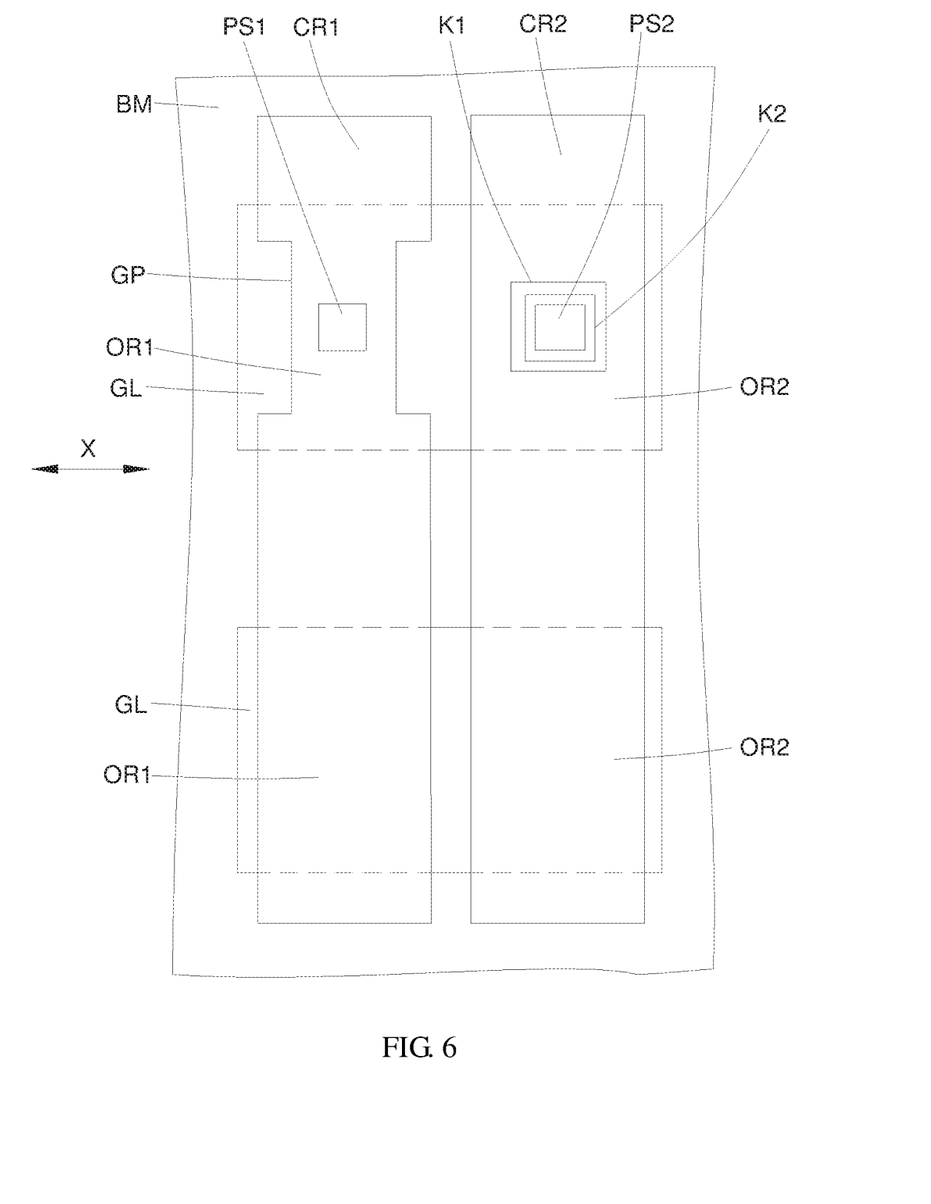
FIG. 6 is a schematic plane diagram of a color resistance boundary opening.

Further Optionally, as shown in FIG. 5 and FIG. 6, an openings GP is formed at two side boundaries of the color resistance CR1 along a length direction (the horizontal X direction in FIG. 6) of the scanning line GL within the overlapping region OR1. Therefore, the distance between the scanning line GL on the switch array substrate 110 and the transparent electrode layer CE on the opposite substrate 120 is relatively long, the capacitance between the scanning line GL and the transparent electrode layer CE can be reduced, so that the driving load of the scanning line GL is reduced.

In addition, the opposite substrate 120 further includes a substratum B2. The substratum B2 is arranged at a side, away from the switch array substrate 110, of the black matrix BM. The material of the substratum B2 can be, for example, the glass, the quartz, the organic polymer or other suitable materials.

As shown in FIG. 3, the display medium layer 30, such as a liquid crystal layer, is defined between the switch array substrate 110 and the opposite substrate 120.

In addition, it should be noted that the display panel 100 may also be arranged around the display medium layer 30 and arranged in a frame glue (not shown) between the switch array substrate 110 and the opposite substrate 120, so that the frame glue, the switch array substrate 110 and the opposite substrate 120 form a containing space to accommodate the display medium layer 30.

In conclusion, according to the embodiment of the present disclosure, the spacer PS1 is located within the overlapping region OR1 which is formed by the projection of the color resistance CR1 on the switch array substrate 110 and the scanning line GL, and an opening K1 is formed within the overlapping region OR2 which is formed by the projection of the color resistance CR2 on the switch array substrate 110 and the scanning line GL, and a spacer PS2 is located in the opening K1, so as to obtain a larger height difference D between the spacer PS1 and the spacer PS2, the adjustment and control capability of liquid crystal quantity is improved, and the amount of liquid crystal surplus is increased. Further, the black matrix BM defines the opening K2 within the overlapping region OR2, and the spacer PS2 is located in the opening K2 so as to be surrounded by the opening K2, so as to further obtain a larger height difference D between the spacer PS1 and the spacer PS2, the adjustment and control capability of liquid crystal quantity is improved, and the amount of liquid crystal surplus is increased.

Figure 7:
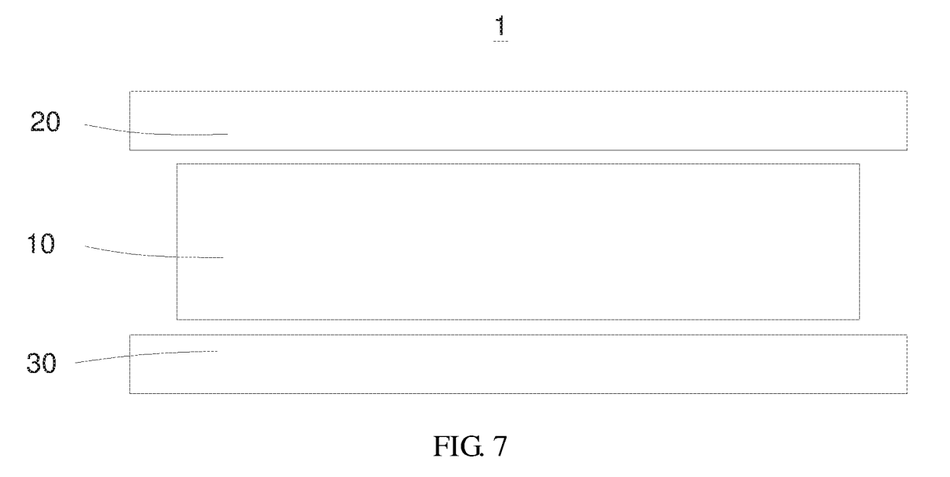
FIG. 7 is a schematic cross-sectional view of a display device according to another embodiment of the present disclosure.

As shown in FIG. 7, another embodiment of the present disclosure provides a display device 1, including a display panel 10, a first polarizer 20 and a second polarizer 30. The display panel 10 can be, for example, a display panel in the aforementioned embodiment. The first polarizer 20 and the second polarizer 30 are respectively arranged on two opposite sides of the display panel 10. The polarization direction of the first polarizer 20 and the polarization direction of the second polarizer 30 are typically perpendicular to each other.

The implementation and technical effects of the display device 1 can be referred to the embodiment of the display panel 10, and will not be described again herein.

In several embodiments provided by the present disclosure, it should be understood that, the system, the device and the method disclosed herein can be realized in other manners. For example, the device embodiments described above are merely illustrative, for example, the division of the units, only a division of logic function, and in actual implementation, additional division manners can be used, for example, a plurality of units or components may be combined or may be integrated into another system, or some features may be ignored or not executed. Another point, the displayed or discussed mutual coupling or direct coupling or communication connection can be through indirect coupling or communication connection of some interfaces, devices or units, and can be in an electrical, mechanical or other form.

The units illustrated as separate components may or may not be physically separated, the component displayed as a unit may be or may not be a physical unit, that is, it can be arranged in one place or can be distributed to multiple network units. According to actual requirements, some or all of the units can be selected to achieve the purpose of the solution of the embodiment.

The embodiments above are preferably embodiments of the present disclosure, and the scope of present disclosure is not limited to such embodiments, equivalent structure conversion based on the specification and the drawing of the present disclosure, or directly or indirectly used in other related technical field, both similarly within the protection scope of the present disclosure.

What is claimed is:

1. A display panel, wherein the display panel comprises-:
a switch array substrate, comprising a scanning line;
an opposite substrate, defined opposite to the switch array substrate, the opposite substrate comprises a color resistance layer and a plurality of spacers, the color resistance layer comprises a first color resistance and a second color resistance, the projection of the first color resistance on the switch array substrate and the scanning line have a first overlapping region, the projection of the second color resistance on the switch array substrate and the scanning line have a second overlapping region, and the plurality of spacers are arranged at a side, adjacent to the switch array substrate, of the color resistance layer, the plurality of spacers comprise a first spacer and a second spacer; and
a display medium layer, defined between the switch array substrate and the opposite substrate;
the first spacer is located within the first overlapping region of the first color resistance and supported by the first color resistance, the second color resistance defines a first opening within the second overlapping region, the second spacer is defined in the first opening, and a first distance from the first spacer to the switch array substrate is less than a second distance from the second spacer to the switch array substrate, wherein a height difference between the first spacer and the second spacer is greater than or equal to the initial thickness of the second color resistance within the second overlapping region before the second color resistance forms the first opening, wherein
the opposite substrate further comprises: a black matrix, located at a side, away from the switch array substrate, of the color resistance layer; the black matrix defines a second opening within the second overlapping region, the second opening is communicated with the first opening, the second spacer is located in the second opening so as to be surrounded by the second opening, and wherein
an opening is formed at two side boundaries of the first color resistance along a length direction of the scanning line within the first overlapping region.

2. The display panel according to claim 1, wherein the height of the first spacer is larger than the height of the second spacer.

3. The display panel according to claim 1, wherein the second opening is the same as the first opening in shape, and the opening size of the first opening is larger than the opening size of the second opening.

4. The display panel according to claim 1, wherein the height difference between the first spacer and the second spacer is greater than or equal to the sum of the initial thickness of the second color resistance within the second overlapping region before the second color resistance forms the first opening and the initial thickness of the black matrix within the second overlapping region before the black matrix forms the second opening.

5. The display panel according to claim 1, wherein the opposite substrate further comprises a transparent electrode layer, the transparent electrode layer is located at a side, adjacent to the switch array substrate, of the color resistance layer, the transparent electrode layer covers the first color resistance and the second color resistance, the transparent electrode layer is further located in the first opening and the second opening; the first spacer and the second spacer are located at a side, adjacent to the switch array substrate, of the transparent electrode layer.

6. The display panel according to claim 1, wherein the opposite substrate further comprises a black matrix and a transparent electrode layer, the black matrix is located at a side, away from the switch array substrate, of the color resistance layer, the transparent electrode layer is located at a side, adjacent to the switch array substrate, of the color resistance layer, the transparent electrode layer covers the first color resistance and the second color resistance, the transparent electrode layer is further located in the first opening; the first spacer and the second spacer are located at a side, adjacent to the switch array substrate, of the transparent electrode layer.

7. A display device, comprising a first polarizer, a second polarizer, and a display panel, wherein the first polarizer and the second polarizer are respectively arranged on two opposite sides of the display panel, wherein the display panel comprises:

a switch array substrate, including a scanning line;

an opposite substrate, defined opposite to the switch array substrate, the opposite substrate comprises a color resistance layer and a plurality of spacers, the color resistance layer comprises a first color resistance and a second color resistance, the projection of the first color resistance on the switch array substrate and the scanning line have a first overlapping region, the projection of the second color resistance on the switch array substrate and the scanning line have a second overlapping region, and the plurality of spacers are arranged at a side, adjacent to the switch array substrate, of the color resistance layer, the plurality of spacers comprise a first spacer and a second spacer; and a display medium layer, defined between the switch array substrate and the opposite substrate;

the first spacer is located within the first overlapping region of the first color resistance and supported by the first color resistance, the second color resistance defines a first opening within the second overlapping region, the second spacer is defined in the first opening, and a first distance from the first spacer to the switch array substrate is less than a second distance from the second spacer to the switch array substrate, wherein a height difference between the first spacer and the second spacer is greater than or equal to the initial thickness of the second color resistance within the second overlapping region before the second color resistance forms the first opening, wherein the opposite substrate further comprises: a black matrix, located at a side, away from the switch array substrate, of the color resistance layer; the black matrix defines a second opening within the second overlapping region, the second opening is communicated with the first opening, the second spacer is located in the second opening so as to be surrounded by the second opening, and wherein an opening is formed at two side boundaries of the first color resistance along a length direction of the scanning line within the first overlapping region.

8. The display device according to claim 7, wherein the height of the first spacer is larger than the height of the second spacer.

9. The display device according to claim 7, wherein the second opening is the same as the first opening in shape, and the opening size of the first opening is larger than the opening size of the second opening.

\* \* \* \* \*